(12) United States Patent
Lin et al.

(10) Patent No.: US 7,706,276 B2
(45) Date of Patent: Apr. 27, 2010

(54) SYSTEMS AND METHODS FOR WIRELESS COMMUNICATIONS

(75) Inventors: Qing Lin, Shenzhen (CN); Bin Gan, Shenzhen (CN); Xiaoyun Jing, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 11/680,607

(22) Filed: Feb. 28, 2007

(65) Prior Publication Data

US 2008/0089228 A1 Apr. 17, 2008

(51) Int. Cl.
*G06F 11/00* (2006.01)
*H04J 3/00* (2006.01)
*H04L 12/56* (2006.01)

(52) U.S. Cl. .................. 370/235; 370/464; 370/395.52

(58) Field of Classification Search ................ 370/229, 370/230.1, 235, 236, 310, 412, 431, 437–439, 370/464, 465, 469, 522, 524; 709/230, 232
See application file for complete search history.

(56) References Cited

U.S. PATENT DOCUMENTS

| | | | |
|---|---|---|---|
| 6,597,682 B1 * | 7/2003 | Kari ........................... 370/348 |
| 6,738,368 B1 * | 5/2004 | Terry .......................... 370/342 |
| 6,757,248 B1 * | 6/2004 | Li et al. ....................... 370/235 |
| 7,047,312 B1 * | 5/2006 | Aweya et al. ................ 709/235 |
| 7,437,154 B2 * | 10/2008 | Hahn ....................... 455/426.2 |
| 7,627,001 B2 * | 12/2009 | Craft et al. ................... 370/469 |
| 2003/0072261 A1 * | 4/2003 | Shinagawa ................... 370/229 |
| 2003/0103459 A1 * | 6/2003 | Connors et al. ............. 370/235 |
| 2005/0025077 A1 * | 2/2005 | Balasubramanian et al. 370/310 |
| 2005/0270975 A1 * | 12/2005 | Meylan et al. ............... 370/229 |
| 2006/0140193 A1 * | 6/2006 | Kakani et al. ........... 370/395.42 |
| 2006/0215685 A1 * | 9/2006 | Capone ....................... 370/438 |
| 2007/0058669 A1 * | 3/2007 | Hoffmann et al. ........... 370/466 |
| 2007/0091801 A1 * | 4/2007 | Shahidi et al. .............. 370/230 |
| 2007/0091900 A1 * | 4/2007 | Asthana et al. ......... 370/395.42 |
| 2007/0195797 A1 * | 8/2007 | Patel et al. ................... 370/400 |
| 2007/0297334 A1 * | 12/2007 | Pong .......................... 370/235 |
| 2008/0080464 A1 * | 4/2008 | Speight ....................... 370/342 |
| 2008/0304413 A1 * | 12/2008 | Briscoe et al. .............. 370/235 |

OTHER PUBLICATIONS

CN17005308A,Huawei Technologies Co. LTD, Dec. 17, 2005, pp. 2-8.
JP2006245887A,"Method of Scheduling Transmission Packet in Wireless Mac Processing Section, Program and Wireless Communication Apparatus", Daini Denden KK, Sep. 14, 2006, 9pp.
JP9224051A, Toshiba KK, Aug. 26, 1997, 9pp.

\* cited by examiner

*Primary Examiner*—Chi H Pham
*Assistant Examiner*—Warner Wong
(74) *Attorney, Agent, or Firm*—Conley Rose, P.C.; Grant Rodolph

(57) ABSTRACT

A method to improve TCP throughput by separating TCP acknowledgment flow from TCP normal data flow in a wireless communications environment. This method creates dedicated signaling air interface link and signaling A10 link for TCP acknowledgment flow and assigns a higher priority value to TOS field of IP packets encapsulating TCP acknowledgments than those encapsulating TCP normal data.

11 Claims, 14 Drawing Sheets

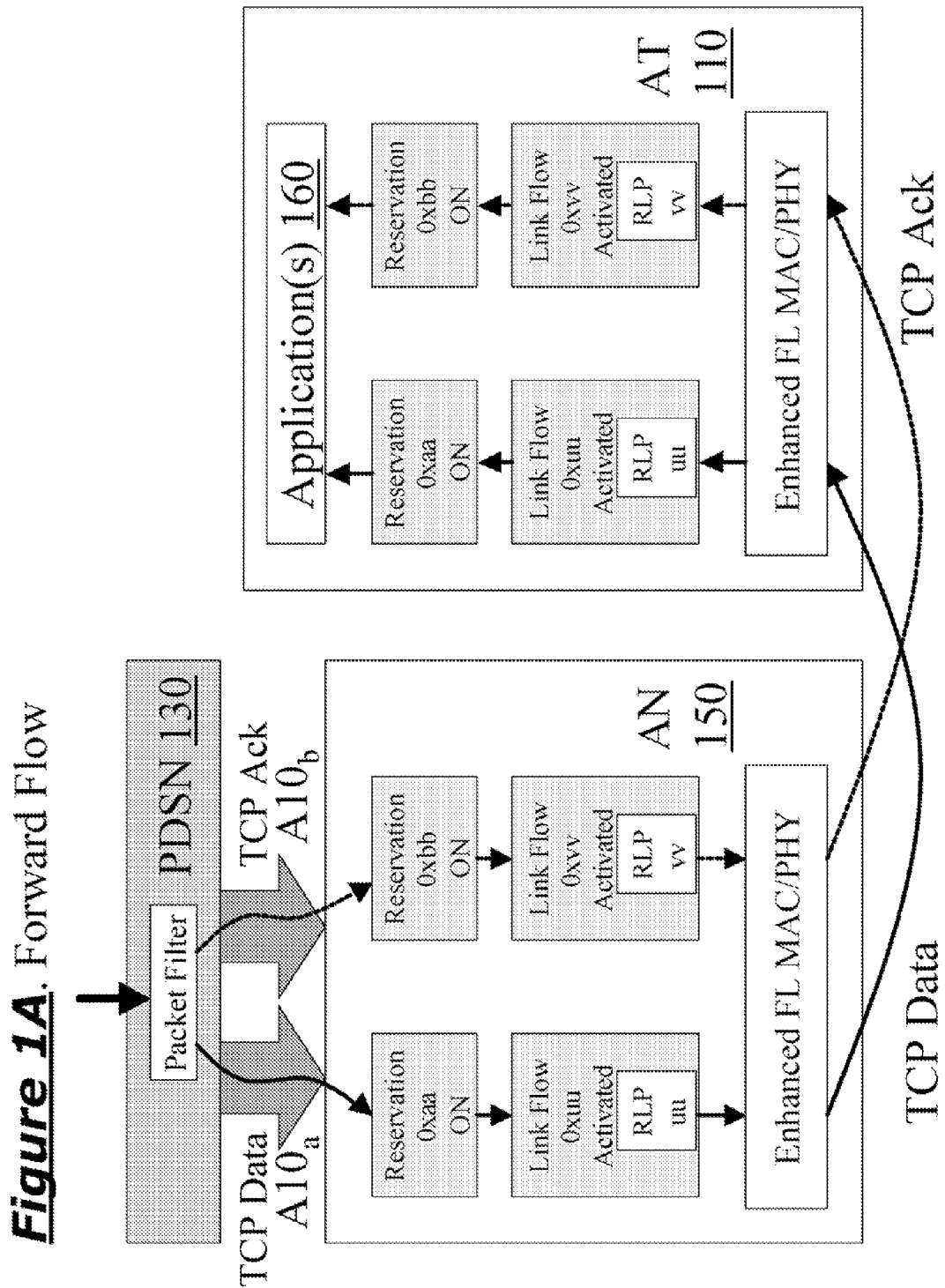

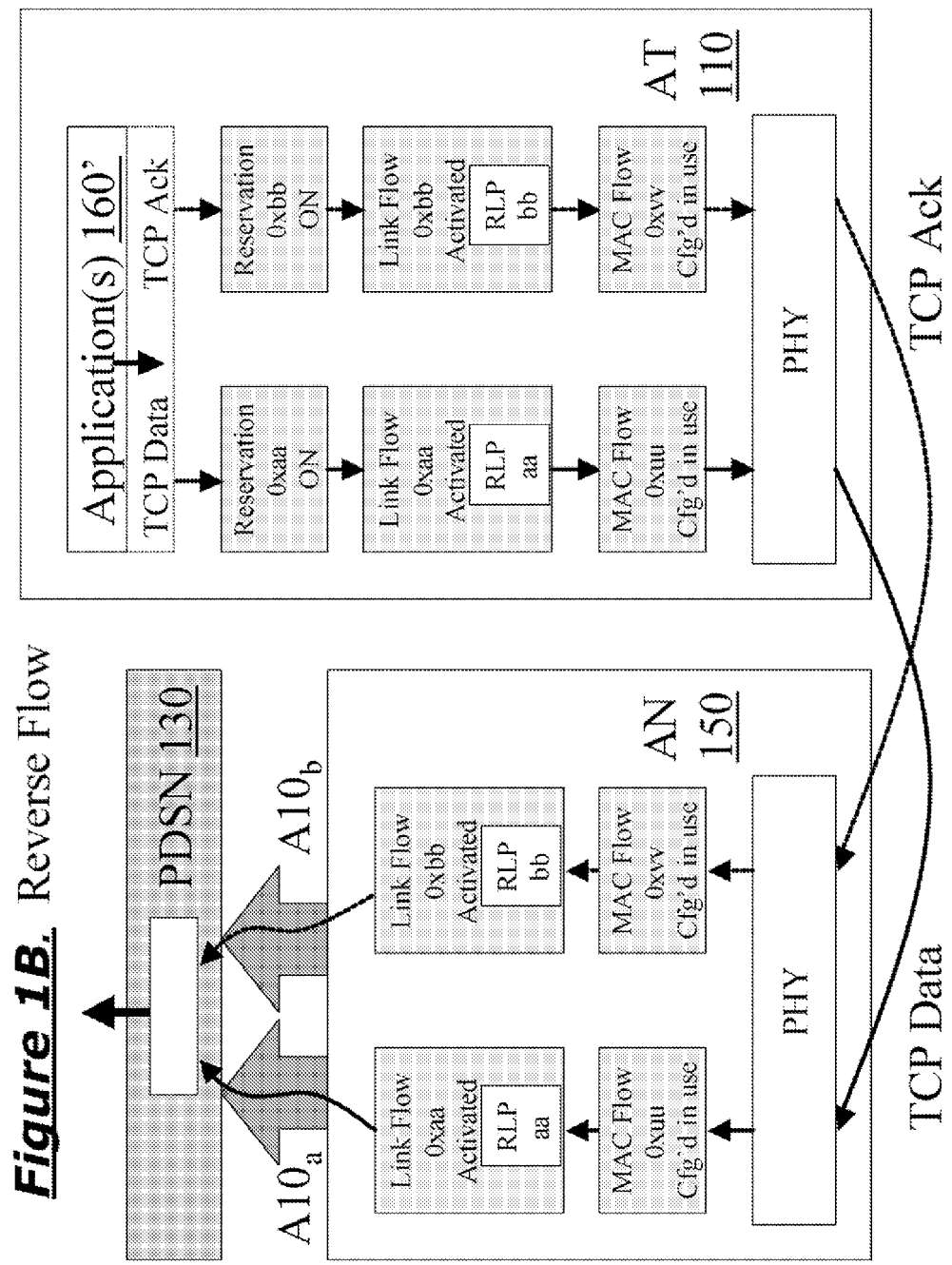
Figure 1B. Reverse Flow

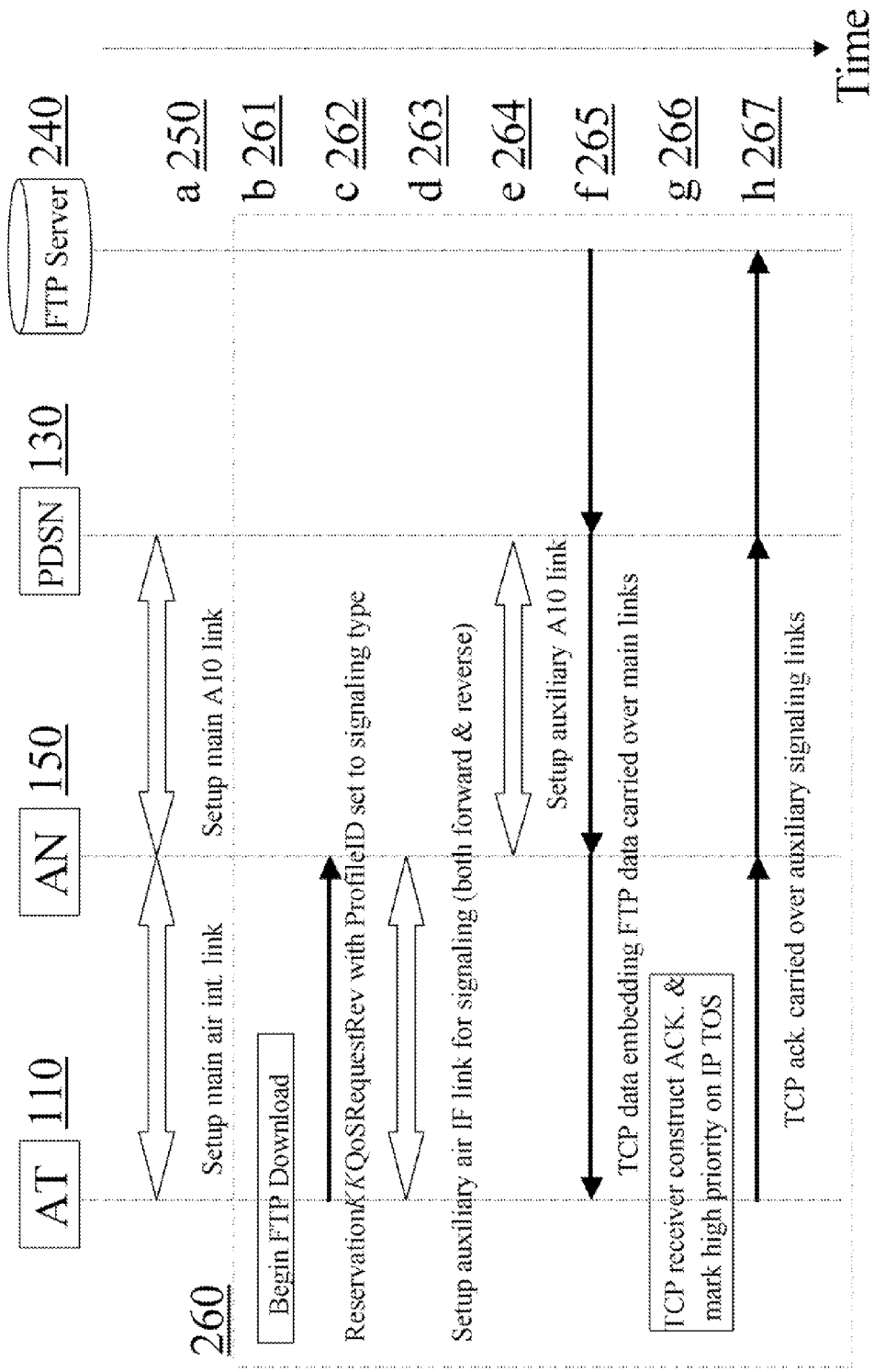
Figure 2A. Forward flow

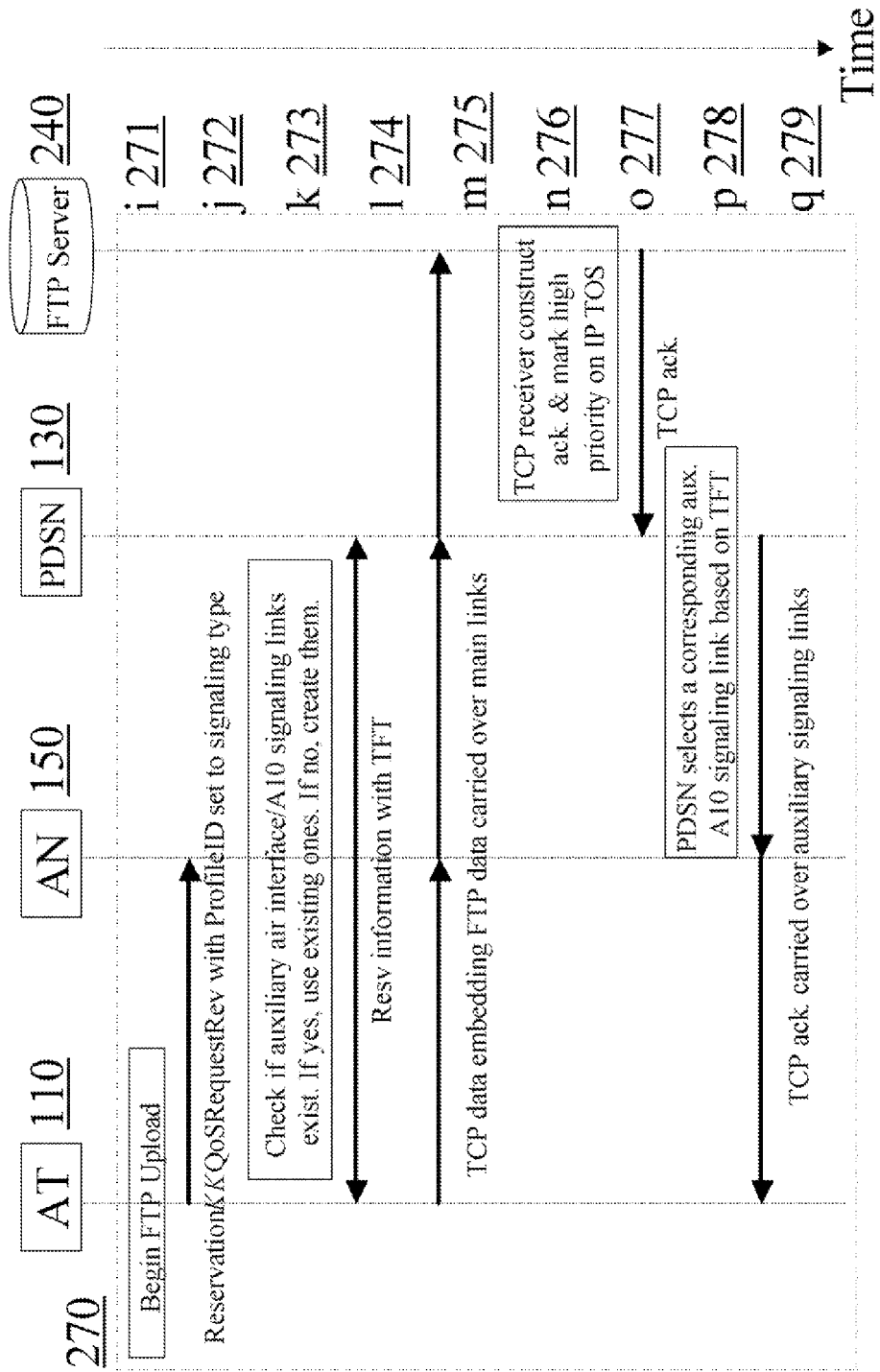

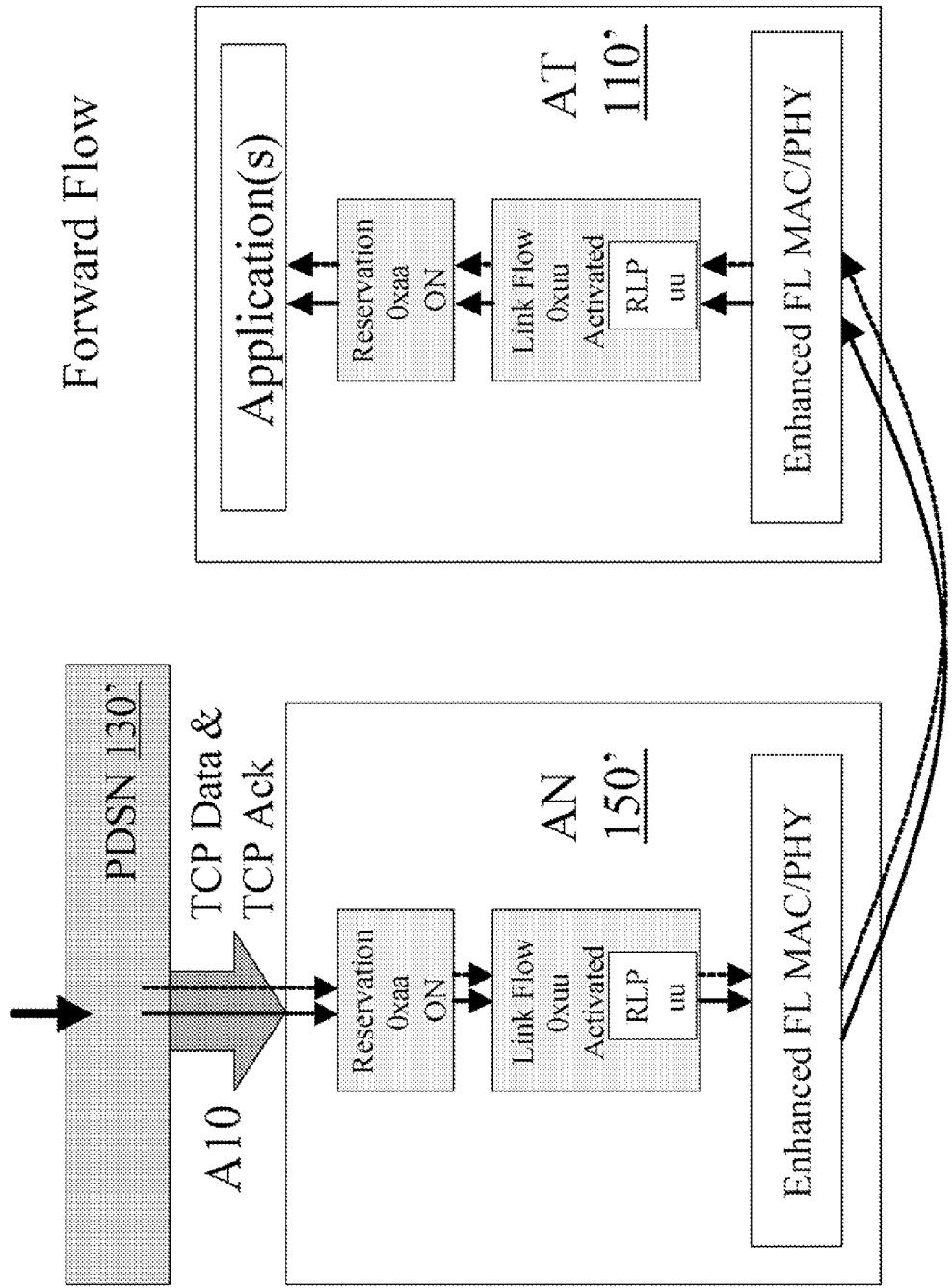
*Figure 3A* – PRIOR ART: Forward Flow.

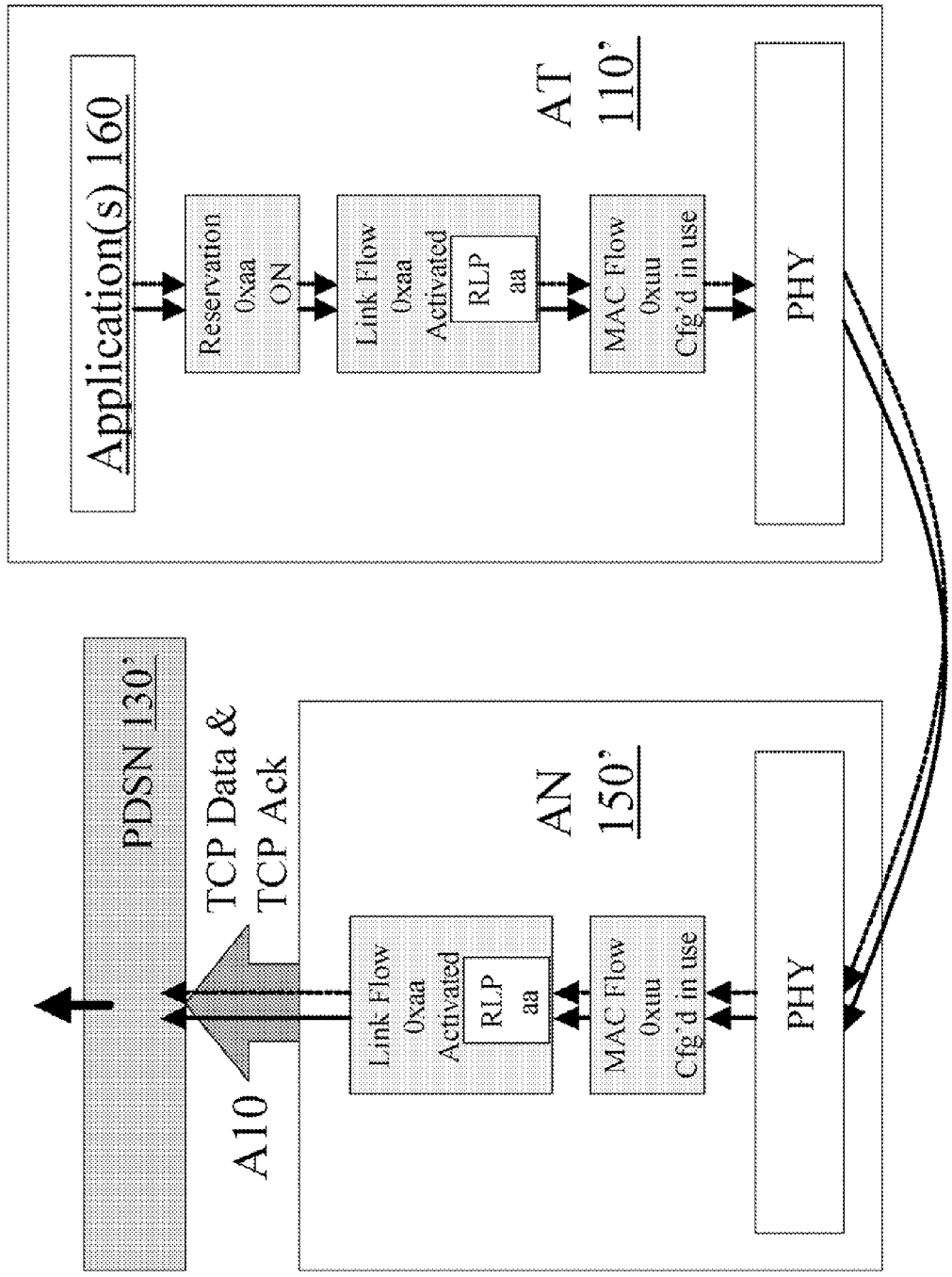
*Figure 3B* – PRIOR ART - Reverse Flow.

_Figure 4_ – PRIOR ART
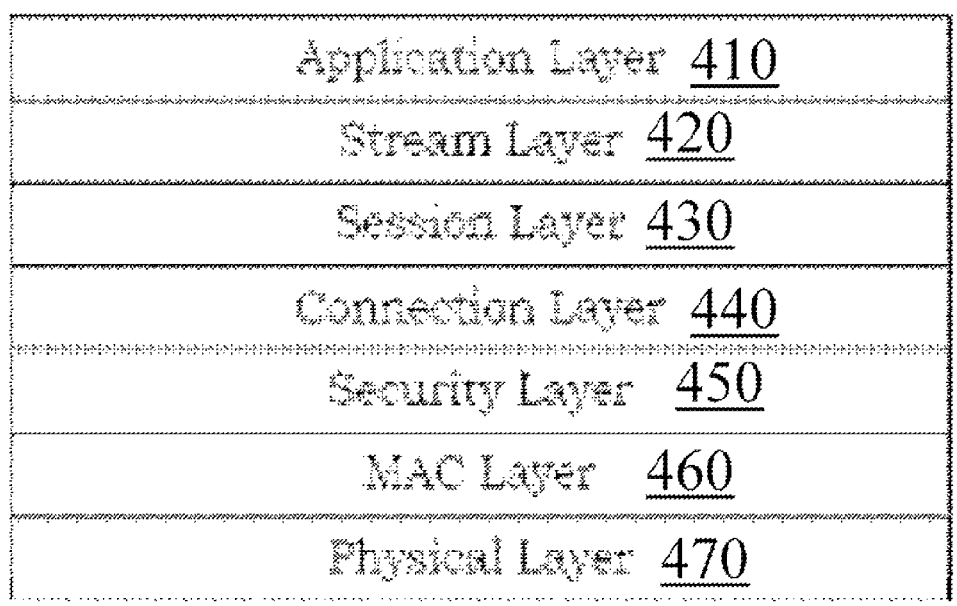

(b) IPv6 Header

• ~ W packets per RTT

SYSTEMS AND METHODS FOR WIRELESS COMMUNICATIONS

BACKGROUND OF THE INVENTION

1. Field of the Invention

The present application relates to improving TCP throughput in a wireless communications network, and more particularly to reducing TCP acknowledgment delays by separation of TCP acknowledgment transmissions in wireless networks.

2. Description of Related Art

Supporting TCP/IP based applications is mandatory in today's networking world. Users' demands for mobile services are increasing with greater diversity and complexity for the mobile communications market. Diverse and complex services are presenting unique challenges in supporting TCP/IP based applications in wireless environment.

IP applications over mobile systems are supported by existing standards that use IP to send data. However, to support enhanced IP applications such as FTP, HTTP and multimedia data services, mobile system applications rely on TCP (Transmission Control Protocol) to provide connection-oriented reliable byte-stream services.

The Transmission Control Protocol (TCP), documented in IETF RFC 793, makes up for IP's deficiencies by providing reliable, stream-oriented connections that hide most of IP's shortcomings. Transmission of a data packet is not regarded as complete until a corresponding acknowledgement packet ("ACK") is received. TCP adds a great deal of functionality to the IP service it is layered over.

FIG. 5(e) schematically shows how a segmented application message is encapsulated into a TCP segment, which is itself encapsulated in an IP packet.

FIG. 5(a) gives a large-scale view of a TCP/IP protocol architecture. IP applications over mobile systems are supported by existing standards that use IP 510 to send data. However, enhanced IP applications such as FTP 540, HTTP 530 and multimedia data services, which are desirable for use in mobile systems, rely on TCP 520 (Transmission Control Protocol) to provide connection-oriented reliable byte-stream services.

TCP algorithms operate in both directions, in an almost completely independent manner. A TCP session can be thought of as two independent byte streams, traveling in opposite directions. No TCP mechanism exists to associate data in the forward and reverse byte streams. Only during connection start and close sequences can TCP exhibit really asymmetric behavior (i.e. data transfer in the forward direction but not in the reverse, or vice versa).

Thus TCP is inherently duplex. (Duplex communications are the type of communications that transmissions can simultaneously happen at both directions.) However, if TCP data flow and TCP ACK flow are examined separately, TCP for some applications can be half duplex, or even simplex. Applications like FTP download are simplex: data is sent in only one direction (though control messages like request and ACK are sent in another direction at the same time). Applications like Database query are half duplex: data is sent in one direction in one time, then sent in another direction in other times. (Again, TCP control messages including TCP ACK can be sent in both directions simultaneously).

For duplex communications (where data is sent in both directions simultaneously), TCP employs a technique called piggybacking. Basically, TCP ACK info is carried on a TCP data segment. (ACK field in TCP header indicates whether the data segment contains ACK info or pure data). In that case the data and acknowledgement flows cannot be strictly separated.

Sequence Numbers

TCP uses a 32-bit sequence number that counts bytes in the data stream. Each segment (TPDU) contains the starting sequence number of the data in that segment, and the sequence number (called the acknowledgment number) of the last byte received from the remote peer. With this information, a sliding window protocol is implemented. Forward and reverse sequence numbers are completely independent, and each TCP peer must track both its own sequence numbering and the numbering being used by the remote peer.

TCP uses a number of control flags to manage the connection. Some of these flags pertain to a single packet, such as the URG flag indicating valid data in the Urgent Pointer field, but two flags (SYN and FIN) require reliable delivery as they mark the beginning and end of the data stream. In order to insure reliable delivery of these two flags, they are assigned spots in the sequence number space. Each flag occupies a single byte.

Window Size and Buffering

Each endpoint of a TCP connection will have a buffer for storing data that is transmitted over the network before the application is ready to read the data. This lets network transfers take place while applications are busy with other processing, improving overall performance.

FIG. 6 shows the relationship of TCP window size and delay. To avoid overflowing the buffer, TCP sets a Window Size field in each packet it transmits. In this example, it is set to w (reference number 610). This field contains the amount of data that may be transmitted into the buffer. If this number falls to zero, the remote TCP can send no more data. It must wait until it receives a packet announcing a non-zero window size.

Round-Trip Time Estimation

When a host transmits a TCP packet to its peer, it must wait a period of time for an acknowledgment 620. If the reply does not come within the expected period, the packet is assumed to have been lost and the data is retransmitted. The best value for the maximum wait depends on many factors. Over an Ethernet connection, no more than a few microseconds should be needed for a reply. If the traffic must flow over the wide-area Internet, a second or two might be reasonable during peak utilization times.

All modern TCP implementations seek to answer this question by monitoring the normal exchange of data packets and developing an estimate of how long is "too long". This process is called estimation of Round-Trip Time (RTT) 630. RTT estimates are one of the most important performance parameters in a TCP exchange. This is especially clear if we consider that, on a sufficiently large transfer, all TCP implementations eventually drop packets and retransmit them, no matter how good the quality of the link. If the RTT estimate is too low, packets are retransmitted unnecessarily; if too high, the connection can sit idle while the host waits to timeout.

Thus TCP throughput performance is greatly affected by the delay characteristics of the network which is carrying the IP packets. In a wireless environment the delay characteristics of the network can be more unpredictable, due e.g. to multipath characteristics, delays due to ARQ (automatic repeat request), and other factors discussed below.

The TCP sender bases its retransmission timeout (RTO) on measurements of the round trip delay experienced by previous packets. This allows TCP to adapt automatically to the very wide range of delays found on the Internet. If the path delay variance is high, TCP sets an RTO that is much larger than the mean of the measured delays. If the packet loss rate is low, the large RTO is of little consequence, as timeouts occur only rarely. Conversely, if the path delay variance is low, then TCP recovers quickly from lost packets; again, the algorithm works well. However, when delay variance and the packet loss rate are both high, these algorithms perform poorly, especially when the mean delay is also high.

Because TCP uses returning acknowledgments as a "clock" to time the transmission of additional data, excessively high delays (even if the delay variance is low) also affect TCP's ability to fully utilize a high-speed transmission pipe. It also slows the recovery of lost packets, even when delay variance is small.

Mobile systems should therefore minimize all three parameters (delay, delay variance, and packet loss) as much as possible. Often these parameters are inherently in conflict. For example, on a mobile radio channel, retransmission (ARQ) and/or forward error correction (PEC) can be used to trade off delay, delay variance, and packet loss in an effort to improve TCP performance. While ARQ increases delay variance, FEC does not. However, FEC (especially when combined with interleaving) often increases mean delay, even on good channels where ARQ retransmissions are not needed and ARQ would not increase either the delay or the delay variance.

The tradeoffs among these error control mechanisms and their interactions with TCP can be quite complex, and are the subject of much ongoing research. The common solution today is to adjust buffer sizes based on RTT estimate. For instance, when RTT increases, throughput is guaranteed by increasing the buffer size because Buffer_size=RTT* Bandwidth.

However, increasing buffer size will increase the cost of equipment. Further, it might worsen the delay since allowing more outstanding unacknowledged TCP segments will further congest the network or its communication peer.

Multi-Flow Packet Application

The Multi-Flow Packet Application provides multiple octet streams that can be used to carry octets between the access terminal and the access network.

CDMA2000 1x EV-DO

CDMA2000 1x EV-DO cell phone system is a standard that has evolved from the CDMA2000 mobile phone system and is now firmly established in many areas of the world. The letters EV-DO stand for Evolution Data Only or Data Optimized. It is a data only mobile telecommunications standard that can be run on CDMA2000 networks.

The forward channel forms a dedicated variable-rate, packet data channel with signaling and control time multiplexed into it. The channel is itself time-divided and allocated to each user on a demand and opportunity driven basis. A data only format was adopted to enable the standard to be optimized for data applications. If voice is required then a dual mode phone using separate 1X channel for the voice call is needed. In feet the "phones" used for data only applications are referred to as Access Terminals or ATs.

The forward link possesses many features that are specific to EV-DO, having been optimized for data transmission, particularly in the downlink direction. Average continuous rates of 600 kbps per sector are possible. This is a sixfold increase over CDMA2000 1X and is provided largely by the ability of 1xEV-DO to negotiate increased data rates for individual ATs because only one user is served at a time.

The forward link is always transmitted at full power and uses a data rate control scheme rather than the power control scheme used with 1X, and the data is time division multiplexed so that only one AT is served at a time.

In order to be able to receive data, each EV-DO AT measures signal-to-noise ratio (S/N) on the forward link pilot every slot, i.e. 1.667 ms. Based on the information this provides the AT sends a data rate request to the base station. The AN receives requests from a variety of ATs, and decisions have to be made regarding which ATs are to be served next. The AN endeavors to achieve the best data transfer, and this is done by serving those ATs offering a good signal-to-noise ratio. This is achieved at the expense of users at some distance from the AN's antenna.

Protocol Layering

Many telecommunications standards are defined in a layered structure. FIG. 4 shows an example of this (the HRPD air interface for the CDMA2000). The layered structure of the protocol will be helpful in understanding the operation of the implementations described below. Each layer consists of one or more protocols that perform the layer's functionality.

The Application Layer 410: provides multiple applications, including the Default Signaling Application for transporting air interface protocol messages. It also provides the Default Packet Application for transporting user data.

Stream Layer 420: The Stream Layer provides multiplexing of distinct application streams.

Session Layer 430: The Session Layer provides address management, protocol negotiation, protocol configuration and state maintenance services.

Connection Layer 440: The Connection Layer provides air link connection establishment and maintenance services.

Security Layer 450: The Security Layer provides authentication and encryption services.

MAC Layer 460: The Medium Access Control (MAC) Layer defines the procedures used to receive and to transmit over the Physical Layer.

Physical Layer 470: The Physical Layer provides the channel structure, frequency, power output, modulation, and encoding specifications for the Forward and Reverse Channels.

Each layer may itself contain one or more protocols. Protocols use signaling messages or headers to convey information to their peer protocols at the other side of the air-link.

BRIEF SUMMARY OF THE INVENTIONS

The present application provides a method to improve TCP throughput in a wireless environment. This is done, in a sample embodiment, by separating incoming data and acknowledgement ("ACK") packets (e.g. at the incoming packet filter). In a sample embodiment, once the link flows have been separated, they can be given separate attributes. Specifically, acknowledgement packets can be flagged as delay sensitive, while the data packets are not. One result of this is that the average round trip time is reduced. Another result is that the variance in the round trip times is reduced, providing more efficient buffering and better throughput. Preferably packet types are also separated in the reverse link operation, which again permits acknowledgement packets to be designated as delay sensitive. This improves throughput in applications where data flow is asymmetric, e.g. in FTP or HTTP. Various embodiments are preferably implemented without modification to existing TCP implementations, leading to an improved system interoperable with existing systems.

The disclosed innovations, in various embodiments, provide one or more of at least the following advantages:

The disclosed inventions reduce the incidence of bottlenecks in TCP acknowledgement traffic, and therefore increase TCP throughput in many cases.

Because FTP is built on TCP, improvement of TCP throughput leads to improved FTP performance.

Because HTTP is built on TCP, improvement of TCP throughput leads to improved HTTP performance.

The disclosed inventions are particularly helpful in reducing the incidence of bottlenecks when piggybacked segments are not prevalent.

Because asymmetric data flows are less likely to utilize piggybacking, the disclosed inventions can provide improved performance in full-duplex communication when data flows are asymmetric.

Because piggybacking is not utilized in half-duplex communications, the disclosed inventions can provide improved performance in half-duplex communication.

The disclosed inventions reduce TCP acknowledgment delays, and therefore the inventions lead to reduced average round-trip time.

Because piggybacking is not utilized in half-duplex or simplex operations, the disclosed inventions can be used to separate acknowledgment from data, leading to improved results in half-duplex or simplex TCP-based operations.

The disclosed inventions, by avoiding TCP acknowledgement bottleneck problems, reduce variance in TCP delays. Because TCP acknowledgment delay contributes to variance in round-trip times, the reduced variance in TCP acknowledgment delay also reduces variance in round-trip times.

Because TCP utilizes a round-trip time based timer to determine the packet loss, the disclosed inventions, by reducing the average round-trip time, also reduce the incidence of premature determination of packet loss.

Because the disclosed inventions reduce TCP acknowledgment delay, therefore the sender's window size can be increased earlier leading to improved TCP throughput.

As noted above, the disclosed inventions reduce the incidence of premature determination of packet loss, and hence the incidence of unnecessary packet retransmission. The reduction of packet retransmission leads to improved air bandwidth utilization.

Since the disclosed inventions require no modifications to existing TCP/IP technology and implementations, the integration and interoperability of the inventions with TCP applications is easy and seamless.

BRIEF DESCRIPTION OF THE DRAWINGS

The disclosed inventions will he described with reference to the accompanying drawings, which show important sample embodiments of the invention and which are incorporated in the specification hereof by reference, wherein:

FIG. 1A shows an example of forward flow routing, according to disclosed innovations, to expedite acknowledgement packets.

FIG. 1B shows an example of reverse flow routing, according to disclosed innovations, to expedite acknowledgement packets.

FIG. 2A shows how a sample embodiment works in support of a FTP download application.

FIG. 2B shows how a sample embodiment works in support of a FTP download application.

FIG. 3A shows how the conventional handling of forward flows would differ from that of FIG. 1A, and FIG. 3B shows how the conventional handling of reverse flows would differ from that of FIG. 1B.

FIG. 4 shows the conventional cdma2000 HRPD Air Interface Protocol Layering Architecture.

FIG. 5($b$) shows conventional header structure of IPv4 Packet.

FIG. 5($c$) shows conventional TOS Field and specified values.

FIG. 5($d$) shows a conventional header structure of IPv6 Packet.

FIG. 5($e$) shows how segments of an application message are conventionally encapsulated info a TCP segment, and then info an IP packet.

DETAILED DESCRIPTION OF THE PREFERRED EMBODIMENTS

The numerous innovative teachings of the present application will be described with particular reference to presently preferred embodiments (by way of example, and not of limitation).

Figure 1C:
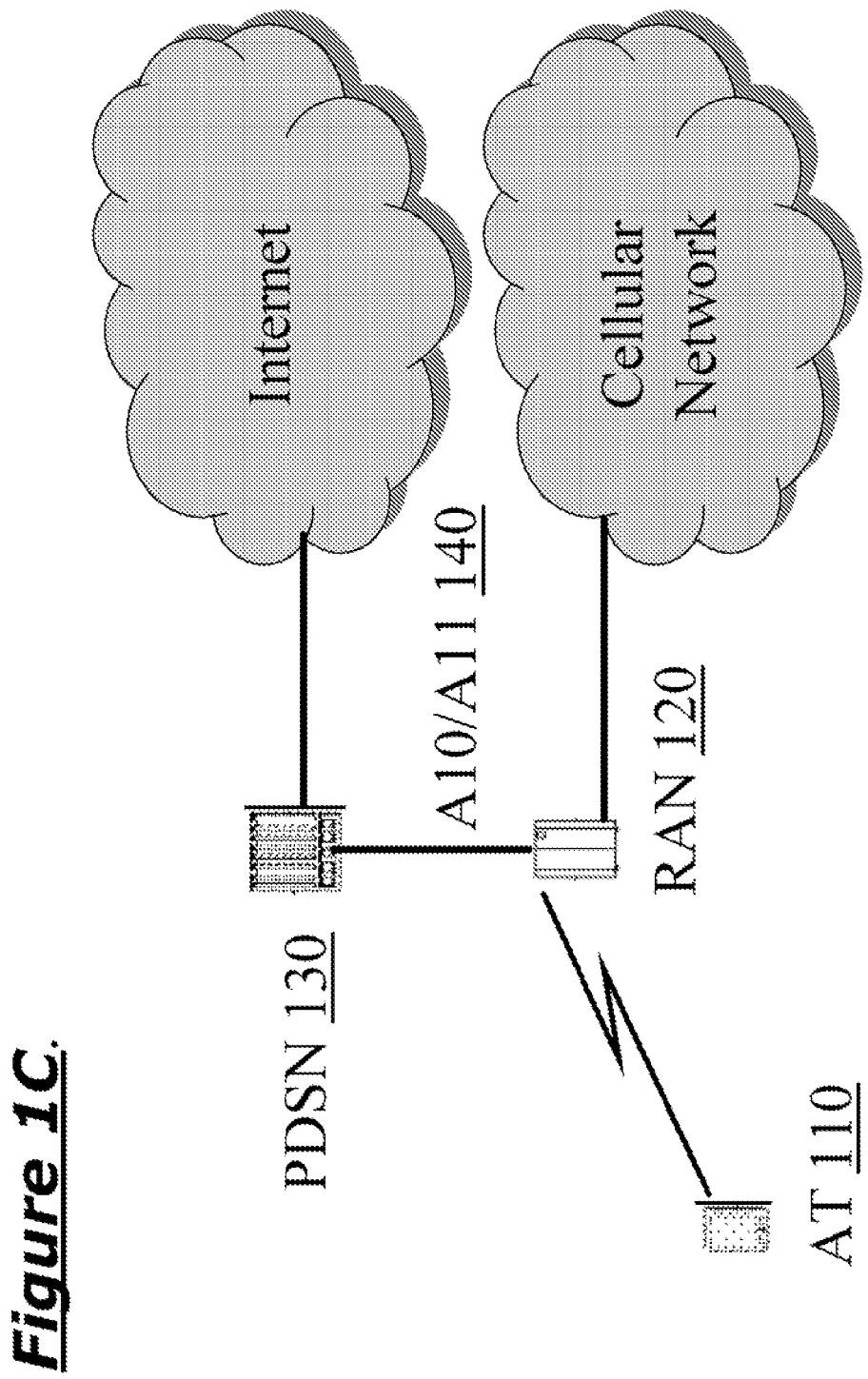
FIG. 1C illustrates an example of a network which is advantageously modified to include one or more of the inventions disclosed herein, and thereby improve TCP throughput.
Figure 5A:
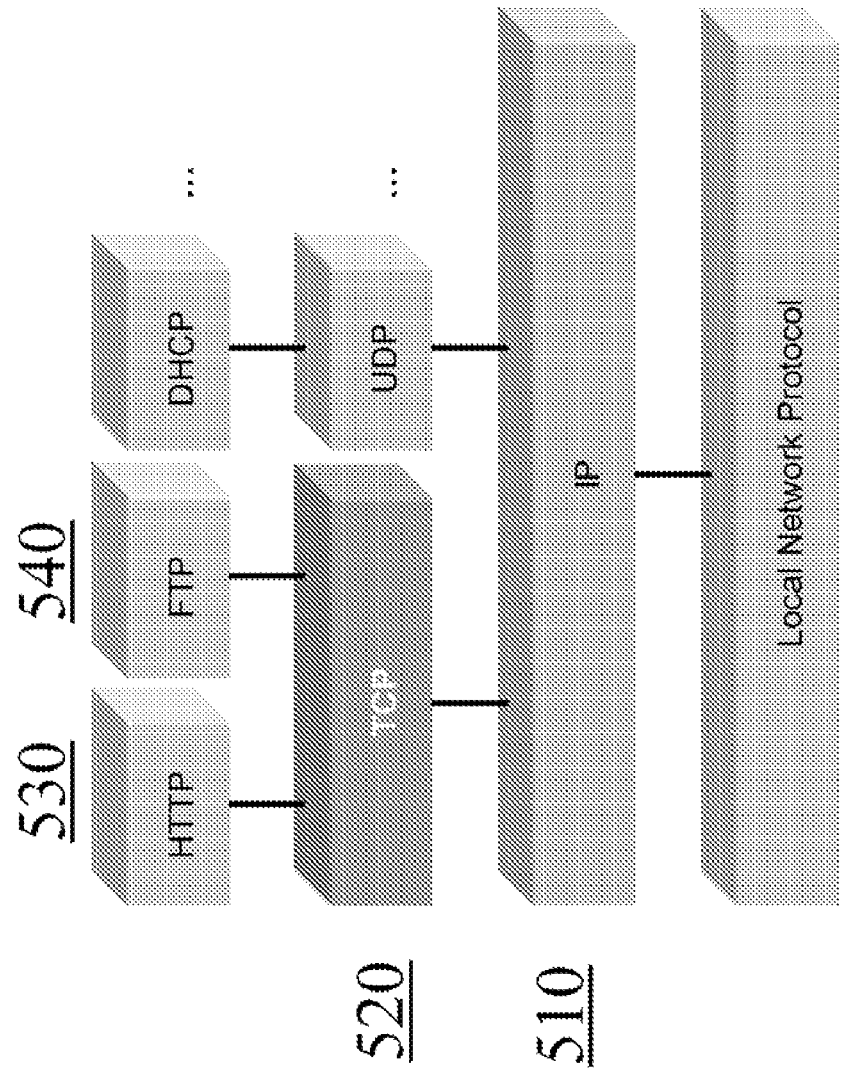
FIG. 5($a$) shows a conventional TCP/IP Protocol Architecture.
Figure 5B:
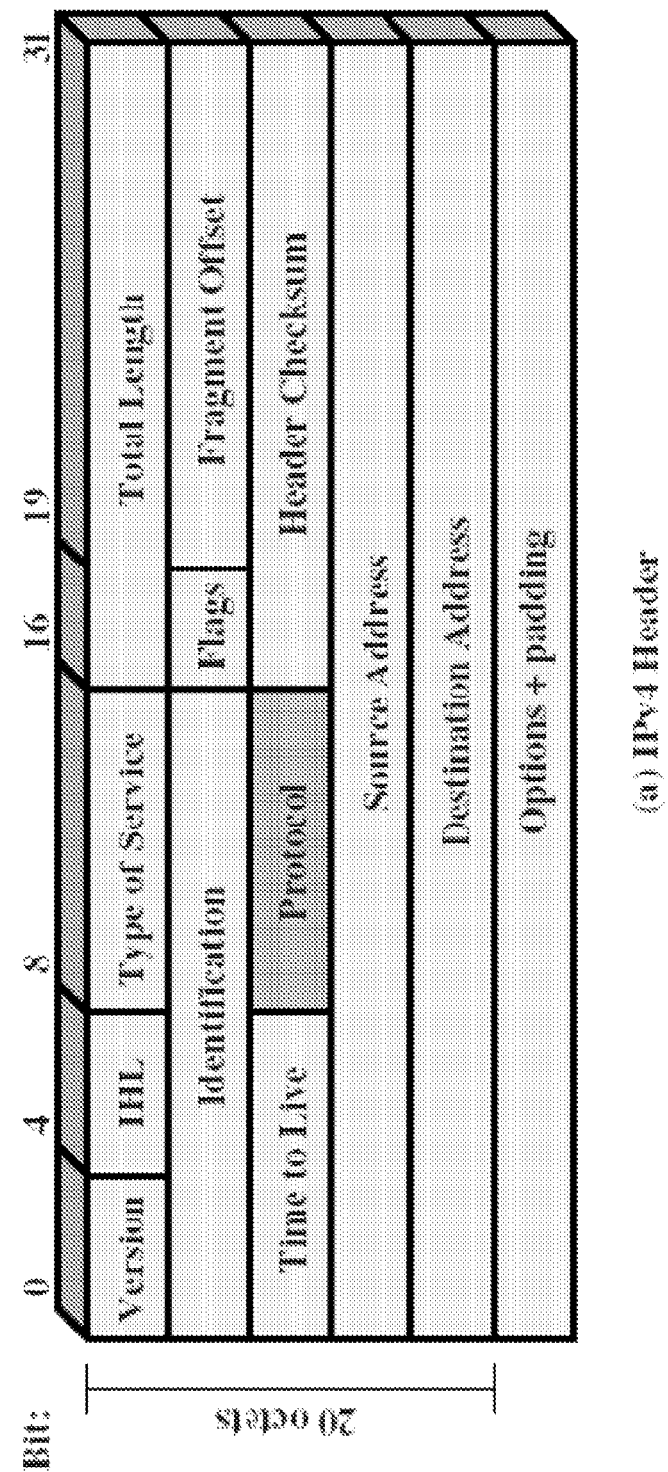
Figure 5C:
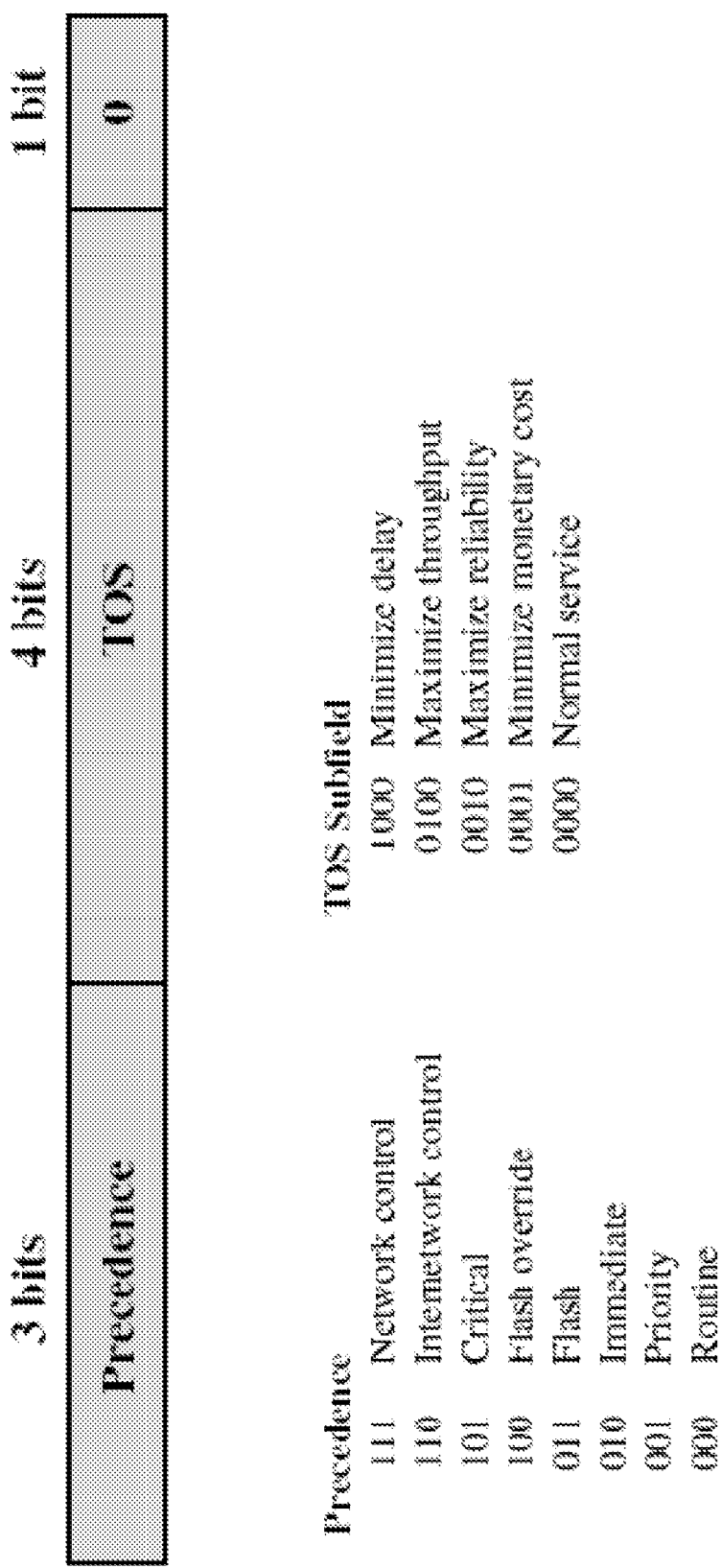
Figure 5D:
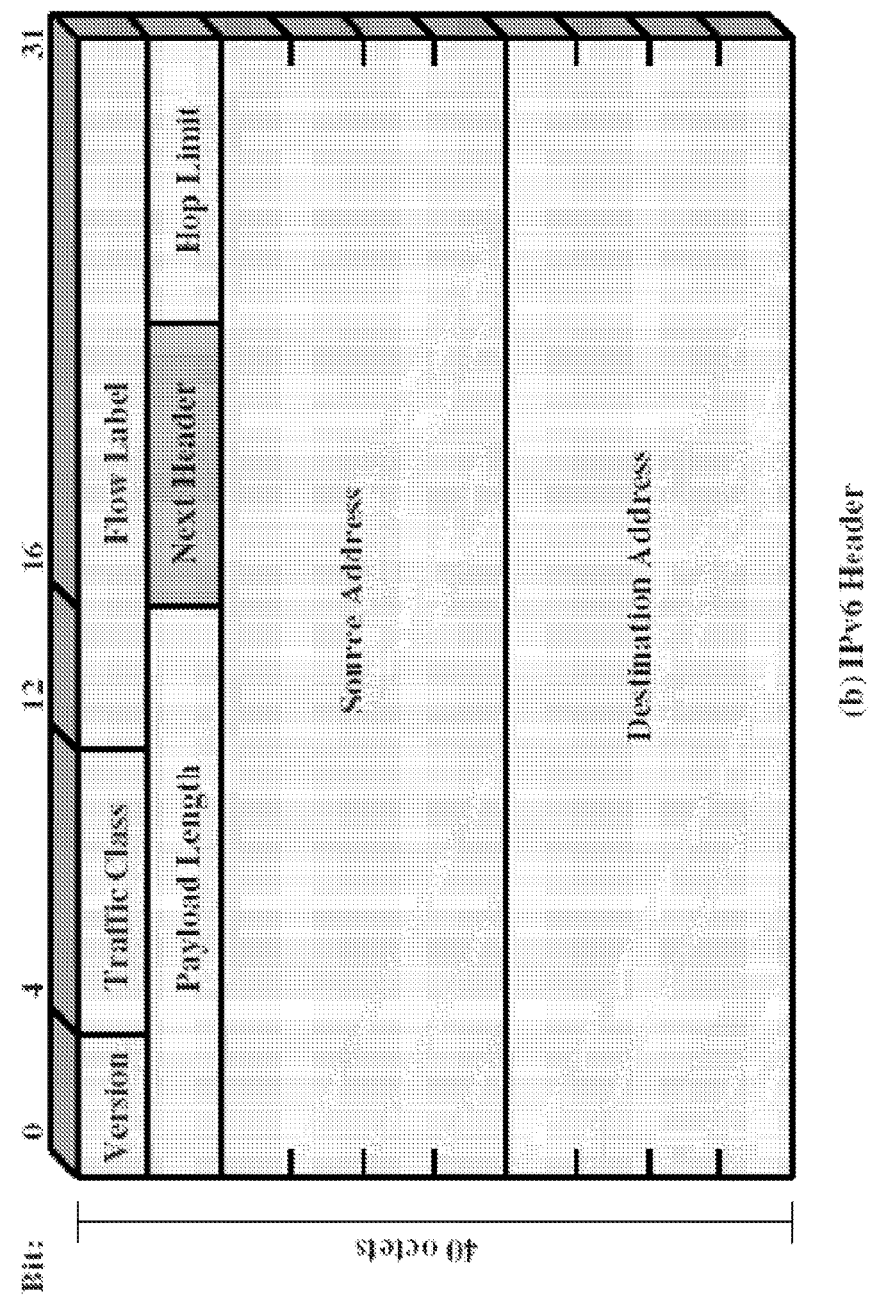
Figure 5E:
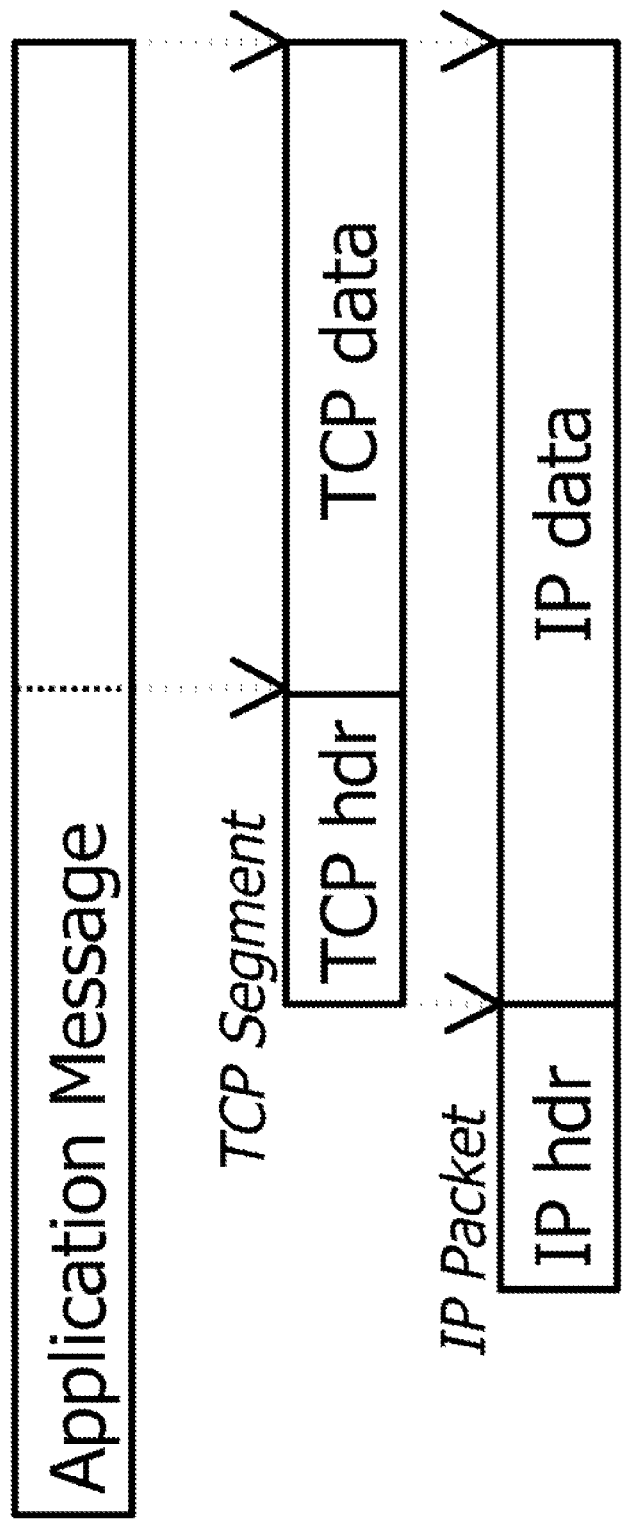
Figure 6:
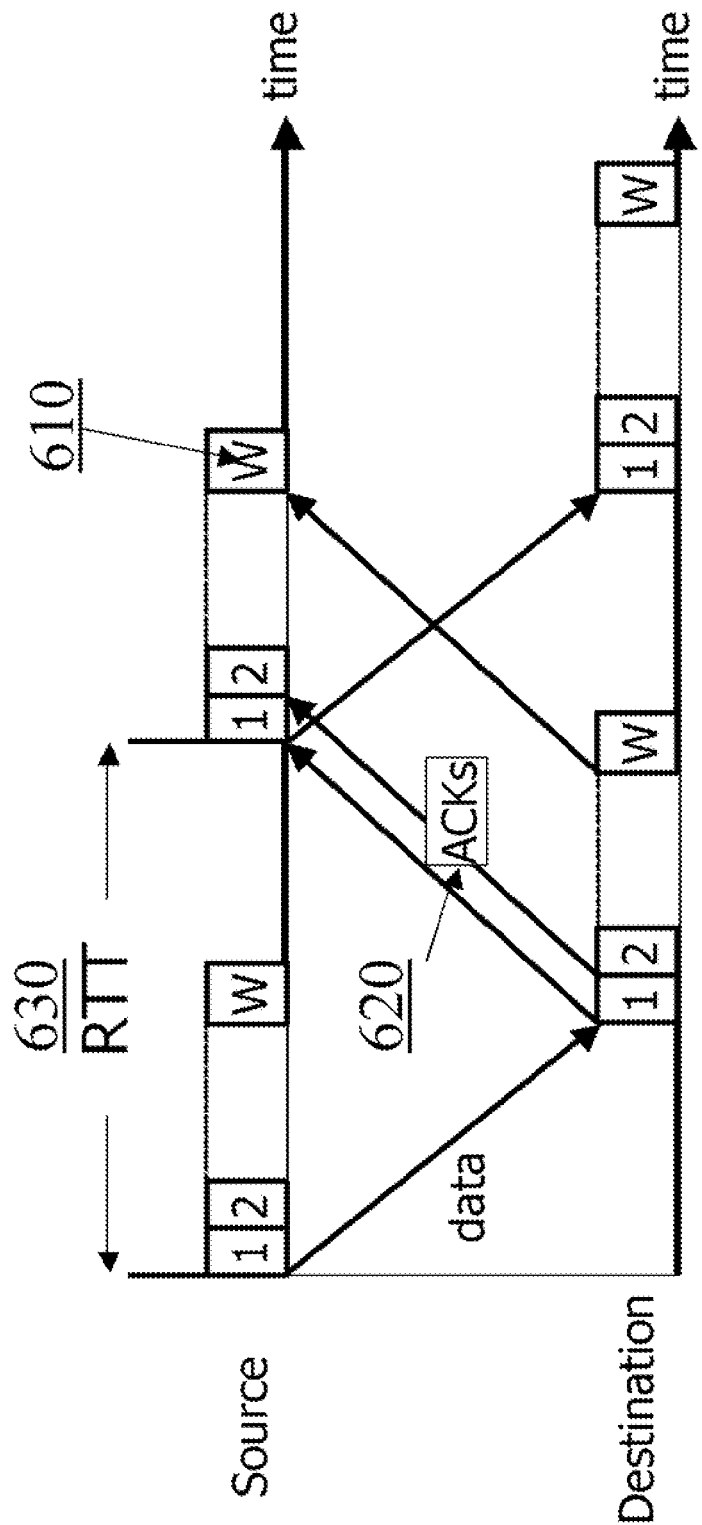
FIG. 6 shows the conventional relationship of TCP window size (buffer) and delay.

FIG. 1C illustrates an example of a network which is advantageously modified to include one or more of the inventions disclosed herein, and thereby improve TCP throughput. Access Terminal (AT) 110 is e.g. an advanced cellphone, which interfaces to Radio Access Network (RAN) 120. AT can also be referred by other names, such as mobile unit, mobile station or user equipment, etc, and can also be PDA or PC equipped with wireless communications capabilities, and RAN can also be named, for example, Access Network (AN) or Base Station (BS), etc. Packet Service Data Node (PDSN) 130 (or Packet Data Node or Data Network Node, etc) provides an interface to the Internet. RAN 120 provides an interface to the PDSN 130 via the RAN-to-PDSN interface 140 (also known as the R-P or A10/A11 interface). (IS-2001 defines the R-P interface as two separate interfaces: the A10 interface, which carries user data, and the A11 interface, which carries signaling data.) The techniques discussed below provide more efficient handling of TCP activity from the AT 110, through RAN 120 and PDSN 130 (in this example), to the Internet.

A general conceptual overview will be given first, referencing FIGS. 1A and 1B, followed by a more detailed review which references FIGS. 2A and 2B.

Conceptual Overview

FIG. 1A shows how forward flows are handled in a sample embodiment discussed above. Actions taken in a fixed access network (AN) or RAN 150 are shown on the left side, and actions taken in a mobile access terminal AT 110 are shown on the right.

Initially the PDSN 130 classifies incoming packets. The PDSN normally sees IP packets rather than TCP segments, even though it could check TCP segment headers for ACK field value. Therefore, the PDSN 130 can only check the TOS field of IPv4 packets (or the Traffic Class field for IPv6 packets). For reference, FIG. 5($b$) shows the header format of an IPv4 packet, FIG. 5($c$) shows the TOS (Type of Service) field format and its specified values (in IPv4), and FIG. 5($d$) shows the header format of IPv6 Packet.

Two separate A10 links are set up between AN 150 and PDSN 130: A10*a* for packets which have a lower priority setting on their TOS field and carries TCP segments without acknowledgment bits set, and A10*b* for packets which have a higher priority setting on their TOS field and carries TCP segments with acknowledgement bits set. And between AN 150 and AT 110 separate reservations (labeled as 0xaa and 0xbb in this example) are assigned to connect these two links. Two different link flows correspondingly occur (labeled as 0xuu and 0xvv in this example), and these drive two different Radio Link Protocol (RLP) instances uu and vv. These different link flows carry different parameters down to the Media Access Control (MAC) layer, and hence the radio transmission at the physical layer (PHY) is controlled so that the ACK channel has higher priority.

Thus when the TCP entity of the application (or applications) 160 receives the TCP segments, the TCP segments with acknowledgement bits set have been expedited, completely invisibly to the application.

Reservations are identified by an 8-bit ReservationLabel. The reservation 0xaa represents TCP data flow and the reservation 0xbb TCP acknowledgment flow. Link flows represent RLP flows across air interface. They are identified by Link Flow ID. Link Flow 0xuu carries reservation 0xaa and Link Flow 0xvv carries reservation 0xbb.

FIG. 1B is a similarly conceptual representation of the handling of reverse flows. Here an additional choice exists: in one option the application 160 can be updated to an application 160' which assigns separate reservations to packets which do or do not contain acknowledgement data, and then the flows on the separate reservations are treated differently just as in FIG. 1A. In another option an additional software layer can be added to classify the packets sent by a conventional application 160, and assign them to the appropriate reservations.

FIG. 3A shows how the conventional handling of forward flows would differ from that of FIG. 1A. Note that the data and acknowledgement flows are NOT separated, so both flows are treated the same. The conventional PDSN 130' still has a packet filter, but the conventional AN 150' does not implement the logic to request separate A10/reservation/flow links for TCP data v. acknowledgment flows. The structure in the conventional AT 110' is similarly simplified. FIG. 3B similarly shows how the conventional handling of reverse flows would differ from that of FIG. 1B. Here the output from a conventional application 160 does not have to be split, and only one flow path is needed.

Greater Detail Regarding Implementation

The preferred embodiment will now be described in greater detail, with reference to FIGS. 2A and 2B. This sample embodiment takes advantage of the support of multi links offered in CDMA2000 1xEVDO Rev. A.

Setup: Based on the delay and bandwidth requirements requested by the upper applications, the sample embodiment attempts to establish multiple air interface links and A10 links, using different parameters in the forward and reverse links to meet the upper layer's QoS requests.

In this sample embodiment, the AT 110 uses ReservationKKQoSRequestRev and ReservationKKQoSRequestFwd signaling messages, with ProfileID set to signaling type QOS, to request an air interface link dedicated for TCP acknowledgment flow.

When AN 150 receives the requests, it checks the ProfileID. If ProfileID is of signaling type and this is the first signaling carrier request from this AT 110, AN 150 sets up an air interface dedicated for the TCP acknowledgment flow for this AT. Otherwise, the TCP acknowledgment flow will be transmitted on an existing air interface. Similarly, the A10 signaling links between AN 150 and PDSN 130 corresponding to the air interface links are also established.

The forward air interface carrier for signaling is of delay sensitive type with a priority higher than the forward air interface carrier for normal data transmission. For the reverse air interface carriers, the one for signaling uses low delay MAC parameter, and the one for data defaults MAC parameter to be high capacity (or best effort); consequently, the reverse MAC channel with low delay parameter setting has a higher priority than the MAC channel with high capacity parameter setting.

Both ends of TCP connection will have to assign higher priority to TCP acknowledgments. The TOS (Type of Service) field of IP packets that encapsulates TCP acknowledgments will be assigned a value of higher priority than those IP packets containing normal TCP data. This TOS value must match that contained in the packet filter component of TFT (Traffic Flow Templates) that is reported by AT 110 to PDSN 130. When PDSN 130 receives an TCP segment from FTP server 240, it determines which A10 link to transmit such a segment on, based on the IP addresses, TCP ports and TOS value matching those stored in PDSN's TFT packet filter component.

FIGS. 2A and 2B are time diagrams showing an FTP application that is used to illustrate the sample embodiment. Step a (250) uses standard procedures to establish the main air interface link between AT 110 and AN 150, and the main A10 link between AN 150 and PDSN 130. This step includes establishment of PPP between AT 110 and PDSN 130, details of which shall have no impact on the sample embodiment and should be obvious to any one skilled in the art.

Steps (b)-(h) (260) handle FTP download, which is mainly composed of data flow in the forward direction. In step b (261), the application initiates FTP download. FTP service is normally considered background service, and therefore, its data transmission is carried from FTP Server 240 to AT 110 without special QoS guarantee. In step c (262), AT 110 requests establishment of dedicated auxiliary reverse links by issuing ReservationKKQoSRequestRev using signaling type ProfileID to notify the QoS requirements on those links. Optionally, step c can also be postponed to when the AT 110 is required to send back TCP acknowledgment for the first TCP segment carrying FTP data in order in step f (265). In step d (263), both forward and reverse auxiliary air interface links for signaling between AT 110 and AN 150 are established and reservation flows are made and activated in the sample embodiment. Again, standard procedures are used and should be obvious to any one skilled in the art. However, a different sample embodiment can also choose to establish only reverse auxiliary air interface link for signaling and reservation flow, leaving the forward auxiliary air interface link and reservation flow for the future when the need arises. In step e (264), a auxiliary A10 signaling link is created between AN 150 and PDSN 130. In step f (265), FTP download starts and FTP data is arriving over main links to AT 110. In step g (266), whenever TCP receiver at AT 110 has TCP acknowledgment to send back, it encapsulates this TCP acknowledgment to an IP packet with its TOS set to higher priority. Finally, in step h (267), the TCP acknowledgment is sent back to FTP server 240 via auxiliary signaling links. Steps (f) 265, (g) 266 and (h) 267 will be repeated in any order as the transmission requires.

Steps (i)-(q) 270 handle FTP upload which is mainly composed of data flow in the reverse direction. In step i (271) application initiates FTP upload. Again, FTP service is normally considered background service, and therefore, its data transmission is carried from AT 110 to FTP Server 240 without special QoS guarantee. FTP data can be carried over main links. In step j (272), AT 110 requests establishment of auxiliary forward signaling links by issuing ReservationKKQoS-RequestFwd using signaling type ProfileID to notify the QoS requirements on those links. In step k (273), AN 150 checks to see if auxiliary air interface signaling link exists. If it is, then no need to create new one, otherwise it follows steps similar to steps (d) 263 and (e) 264 to establish auxiliary air interface link and A10 link for signaling. The Traffic Flow Templates (TFT) may include packet filter(s) that identify the IP flow(s) as indicated by the AT 110. The TFTs are used to map forward traffic to the main or the auxiliary service instances and to indicate if a specific flow treatment (e.g. Header Compression technique) should be applied for the forward packet that matches the packet filter. In step l (274), AT 110 uses RESV message to pass TFT (Traffic Flow Templates) to PDSN 130 such that the TOS (Type of Services) used by Packet Filter corresponding to TCP acknowledgment flow will match TOS field set by FTP server 240 on the IP packets encapsulating TCP acknowledgments. In step m (275), FTP upload starts and FTP data is arriving over main links to FTP Server 240. In step n (276), whenever TCP receiver at FTP Server 240 has TCP acknowledgment to send back, it encapsulates this TCP acknowledgment to an IP packet with its TOS set to higher priority. In step o (277), the TCP acknowledgment is sent back to PDSN 130. In step p (278), PDSN 130 selects, based on TFT, the corresponding A10 signaling link to forward TCP acknowledgment received. Finally in step q (279), TCP acknowledgment is forwarded on the selected auxiliary signaling links. Steps (in) 275 to (q) 279 will be repeated in any order as the transmission requires.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, instead of allocating two A10 links, another embodiment can let TCP data and acknowledgment flows share the same A10 link.

For another example, an embodiment can let TCP data flow share default reservation of best effort QoS with other data flows, instead of allocating dedicated reservation.

Yet for another example, an embodiment can let plural TCP acknowledgment flows share a common reservation, instead of allocating a separate one for each TCP acknowledgment flow.

Further it is also envisioned that an embodiment that without the flexibility to allocate different transport carriers for TCP Data flow and TCP Acknowledgment flow can implement different outgoing buffers for them in a way such that the buffer containing TCP Acknowledgments will have a higher priority to be transmitted.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph, six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for wireless communication, comprising:
creating a first flow path and a second flow path for reverse flow between an Internet-connected station and a mobile station;
encapsulating Transmission Control Protocol (TCP) data in a first Internet Protocol (IP) packet with a first priority;
encapsulating a TCP acknowledgement in a second IP packet with a second priority;
sending the first IP packet via the first flow path;
sending the second IP packet via the second flow path; and
sending a reservation with priority set relative to a flow path priority,
wherein said reservation is carried in a link flow with priority set relative to said reservation priority, and
wherein the second priority is higher than the first priority and the second flow path has a higher priority than the first flow path.

2. A method for wireless communication, comprising:
creating at least two flow paths for reverse flow between an Internet-connected station and a mobile station; and
when an Internet Protocol packet is received, assigning the packet to one or another of said flow paths in dependence on whether control bits indicate the presence of Transmission Control Protocol (TCP)-related acknowledgement bits in the packet;
wherein the different flow paths have different priority assignments, and
wherein said packet contains type of service bits which are used to indicate whether a packet contains TCP-related acknowledgement bits.

3. The method of claim 1, wherein the second flow path is delay-sensitive, and the first flow path is best effort.

4. The method of claim 1, further comprising verifying the existence of the first flow path and the second flow path.

5. A method for wireless communication, comprising:
creating a first flow path and a second flow path for forward flow between an Internet-connected station and a mobile station;
encapsulating Transmission Control Protocol (TCP) data in a first Internet Protocol (IP) packet with a first priority;
encapsulating a TCP acknowledgement in a second IP packet with a second priority;
sending the first IP packet via the first flow path;
sending the second IP packet via the second flow path; and
sending a reservation with priority set relative to a flow path priority,
wherein said reservation is carried in a link flow with priority set relative to said reservation priority, and
wherein the second priority is higher than the first priority and the second flow path has a higher priority than the first flow path.

6. A method for wireless communication, comprising:
creating at least two flow paths for forward flow between an Internet-connected station and a mobile station; and
when an Internet Protocol packet is received, assigning the packet to one or another of said flow paths in dependence on whether control bits indicate the presence of Transmission Control Protocol (TCP)-related acknowledgement bits in the packet;
wherein the different flow paths have different priority assignments, and wherein type of service bits in an IP packet are used to indicate whether a packet contains TCP-related acknowledgement bits.

7. The method of claim 5, classifying the first IP packet and the second IP packet using a packet filter at the Internet-connected station.

8. The method of claim 7, wherein said Internet-connected station selects one of the first flow path or the second flow path to transmit an IP packet based on information contained in an IP packet header and Traffic Flow Template settings of said packet filter.

9. The method of claim 5, further comprising verifying that the first flow path and second flow path have been created.

10. The method of claim 1, wherein the TCP data and the TCP acknowledgement are associated with a common TCP session.

11. The method of claim 5, wherein the TCP data and the TCP acknowledgement are associated with a common TCP session.

* * * * *